March 3, 1970     R. VON TASCHITZKI     3,498,269

ANIMAL DRINKING FOUNTAIN

Filed May 23, 1967

INVENTOR
RAINER VON TASCHITZKI
BY Lowry & Rinehart
ATTYS.

United States Patent Office 3,498,269
Patented Mar. 3, 1970

3,498,269
ANIMAL DRINKING FOUNTAIN
Rainer Von Taschitzki, Cologne-Rath, Heumar, Germany, assignor to Aratowerk Walter von Taschitzki, Cologne-Rath, Heumar, Germany
Filed May 23, 1967, Ser. No. 640,658
Claims priority, application Germany, May 25, 1966,
A 52,581
Int. Cl. A01k 7/12
U.S. Cl. 119—75                                        10 Claims

ABSTRACT OF THE DISCLOSURE

An animal drinking fountain including an elongated tap housing attached to a water pipe, the tap housing being shaped to fit within an animal's mouth, a valve plunger movable within the tap housing and slidably attached to the front of the valve housing through a duct therein, valve means within the valve housing, and valve operating means attached to the outside of the tap housing and operable to open the valve means when the valve operating means is bitten by the animal.

BACKGROUND OF THE INVENTION

This invention relates to an animal drinking fountain in the form of a drinking tap attachable to a water pipe or the like, which the animal concerned can take in its mouth to obtain water, together with the operating means for the valve located within the drinking tap. Such animal drinking fountains are mainly used for watering pigs.

The mode whereby the water is dispersed to the animal is important in watering pigs, because since the pig's bottom lip is shorter than its snout, a pig cannot take water by sucking and much water is wasted if it is offered either standing in a dish or running from a channel without any pressure. However, a precisely calculated stream of water at a certain pressure directed into the animal's mouth is the form whereby the pig can drink water without losing any from its mouth.

With previously known drinking fountains providing a stream of water for animals, the seals provided for the valve operating means have certain disadvantages. In one arrangement, for instance, a rubber sleeve was forced over the valve housing and the operating mechanism within, but after a short time this was bitten through by the animal's sharp teeth and was so made useless.

Another known drinking fountain is provided at its rear end with a lever which the animal can move with its snout and which acts on a plunger passing through the valve chamber wall. A gland is provided for sealing the plunger duct, but this is found to lose its sealing effect in the course of time and need adjusting. Also a gland slows down movement of the plunger so that young animals are unable to drink from such a device, since the force which a pig can exert against a lever with its snout is less with young animals of low body weight than pressure attainable by biting the teeth together.

SUMMARY OF THE INVENTION

The object of this invention is to provide a further development of such animal drinking fountains wherein the constructional elements recognized as advantageous are so arranged that a drinking tap, which the animal being watered can take into its mouth together with operating means therefor, releasable by biting, for a valve controlling the water supply, e.g. a lever acting through a plunger on a valve located inside the drinking tap, delivers a stream of water issuing under pressure and directed into the animal's mouth.

The present invention is a drinking fountain in the form of a tap housing attachable to a water pipe or the like, which the animal being watered, e.g. a pig, can take in its mouth to obtain water, together with operating means releasable by biting, and in which a duct for a valve plunger through the drinking tap is disposed at the front end thereof, and the operating means is disposed adjacent the duct. A drinking fountain formed in this manner needs no special sealing for the plunger duct, since the valve can only be opened by the animal biting on the lever, when the end of the tap housing with the plunger duct is in the animal's mouth, so that water which might emerge from the valve chamber between the plunger and the guide duct wall can only drip into the animal's mouth and is not lost. An advantage is that the force with which the animal must bite on the lever to open the valve need only be very slight, since no sealing elements are hindering plunger movement so that the drinking tap of the invention can be used even by very young animals. Its manufacture is relatively easy and cheap, since almost all components may be turned on automatic lathes.

In embodying the invention the operating arm of the operating means ca nextend to the pipe joint, and the hinge point thereof can be at the top or bottom of the drinking tap. In either case the result is that the operating lever can only be actuated when it is in the mouth of the drinking animal, so that all water emerging reaches the animal's mouth and none can run into the sty, which would make it difficult to keep the animals clean and would increase water consumption.

The emerging stream of water is directed into the animal's mouth by making the valve plunger hollow, so that the water stream emerges along the plunger axis. This arrangement is particularly advantageous since the bore in the plunger gives a saving in material, and also the plunger can provide two functions simultaneously, as it not only transmits the force from operating lever to valve but also acts to supply water and hence replaces a separate outlet fixture.

DESCRIPTION OF THE PREFERRED EMBODIMENTS

Figure 1:
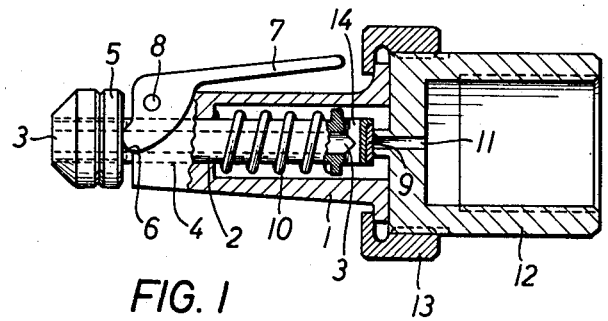
FIG. 1 shows in axial section a drinking fountain of this invention attached to a water pipe.

Inside tap housing 1 a valve plunger 2 provided with a bore 3 is disposed and can move longitudinally. The valve plunger duct 4 passes through the tap housing at the front end thereof. A nut 5 is screwed on to valve plunger 2 and acts as an abutment for a cam 6 of an operating lever 7 pivotally mounted on a bolt 8 affixed to tap 1 adjacent the duct 4. The end of valve plunger 2 located inside the tap housing is provided with a valve disc 9, held pressed against an aperture 11 in a connection fitting 12 by the pressure of a spring 10 surrounding the plunger. The valve is thus closed against the stream, i.e. opens on tension. Transverse apertures 14 allow the water to reach the longitudinal bore 3 in the valve plunger and thus into the animal's mouth, after valve disc 9 is lifted from water exit aperture 11 by actuation of lever 7. A retaining nut 13 connects drinking tap 1 to the fitting 12 screwed onto the water pipe.

Figure 2:
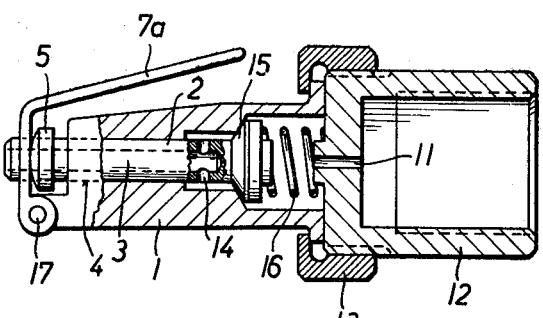
FIG. 2 shows in axial section another embodiment of the drinking fountain of this invention.

The drinking tap shown in FIG. 2 also has a valve plunger 2 provided with a longitudinal bore 3. Since the arrangement here is such that valve body 15 closes with the flow, i.e. is made to open against the pressure of a spring 16, the operating lever 7a is made cranked and connected at 17 to the underside of tap 1. The vertical portion of operating lever 7a cooperates with a nut 5 screwed onto the end of plunger 2 and acting as an abutment, so that when operating lever 7a is depressed, the plunger 2 is displaced in the direction of water exit aperture 11, so that the valve body 15 is lifted from its seat and the path for the water through transverse apertures 14 into longitudinal bore 3 is freed.

Figure 3:
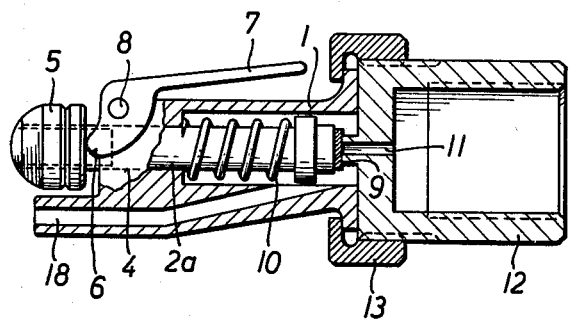
FIG. 3 shows in axial section a third embodiment of the drinking fountain of this invention.

As far as parts 4–13 are concerned, the construction of the drinking tap embodiment shown in FIG. 3 corresponds to that of the FIG. 1 tap. The difference is merely that the valve plunger 2a passing through the front end of the tap has no bore, and in that the water outlet comprises a conduit bore 18 running substantially parallel to valve plunger 2a and ending adjacent its front edge. After the valve disc 9 is lifted from water outlet aperture 11, water runs into conduit bore 18 and then directly into the animal's mouth.

While the animal drinking fountain has been shown and described in detail, it is obvious that this invention is not to be considered as being limited to the exact form disclosed, and that changes in detail and construction may be made therein within the scope of the invention, without departing from the spirit thereof.

What is claimed is:

1. An animal drinking fountain comprising:
   (a) an elongated tap housing having a forward extending portion terminating in a front end wall, said housing having an effective size and shape to fit into an animal's mouth,
   (b) said end wall including an opening at the front end thereof whereby liquid under pressure is directed to an animal,
   (c) means mounting a valve plunger within said housing to move a valve means to opened and closed positions within said housing,
   (d) said valve plunger extending through said opening of the front end wall, and
   (e) valve operating means pivotally mounted on said tap housing to engage the valve plunger,
   (f) said valve operating means includes a rearwardly extending means to be operated by an animal when the animal inserts said elongated tap housing and said rearwardly extending means into its mouth.

2. A fountain as defined in claim 1 wherein
said valve plunger includes a bore through which the liquid is delivered under pressure to the animal when said major portion is in said animal's mouth.

3. A fountain as defined in claim 2 wherein
said valve operating means includes a plunger contacting portion contiguous an abutment means located on said valve plunger,
said rearwardly extending means includes a lever arm extending in a rearward direction away from the front end of the tap housing.

4. A fountain as defined in claim 3 wherein
said valve operating means include a spring means biased against the action of said rearwardly extending means to return said valve means to the closed position.

5. A fountain as defined in claim 4 wherein
said valve plunger moves in a forward direction toward the front of the tap housing to place the valve means in the opened position.

6. A fountain as defined in claim 4 wherein
said valve plunger moves in a rearward direction away from the front of the tap housing to place the valve means in the opened position.

7. An animal drinking fountain comprising:
   (a) an elongated tap housing having a forward extending portion terminating in a front end wall, said housing having an effective size and shape to fit into an animal's mouth,
   (b) a conduit bore means located on said tap housing whereby liquid under pressure is directed to an animal,
   (c) means mounting a valve plunger within said housing to move a valve means to opened and closed positions within said housing,
   (d) said valve plunger extending through an opening located in the front end wall, and
   (e) valve operating means pivotally mounted on said tap housing to engage the valve plunger,
   (f) said valve operating means includes a rearwardly extending means to be operated by an animal when the animal inserts said elongated tap housing and said rearwardly extending means into its mouth.

8. A fountain as defined in claim 7 wherein
said conduit bore means runs substantially parallel to the valve plunger and is displaced laterally therefrom,
said conduit bore includes an outlet opening which is located substantially adjacent the front end of the valve plunger.

9. A fountain as defined in claim 8 wherein
said valve operating means includes a plunger contacting portion contiguous an abutment means located on said valve plunger,
said rearwardly extending means includes a lever arm extending in a rearward direction away from the front end of the tap housing.

10. A fountain as defined in claim 9 wherein
said valve operating means include a spring means biased against the action of said rearwardly extending means to return said valve means to the closed position.

References Cited

UNITED STATES PATENTS

| 1,986,928 | 1/1935 | Hanson | 119—75 |
| 3,179,085 | 4/1965 | McKillip | 119—75 |

FOREIGN PATENTS

| 1,050,131 | 1/1954 | France. |
| 1,376,321 | 9/1964 | France. |

HUGH R. CHAMBLEE, Primary Examiner